(12) United States Patent
Miyazaki

(10) Patent No.: US 8,332,208 B2
(45) Date of Patent: Dec. 11, 2012

(54) INFORMATION PROCESSING APPARATUS, INFORMATION PROCESSING METHOD, AND PROGRAM

(75) Inventor: Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1050 days.

(21) Appl. No.: 12/203,461

(22) Filed: Sep. 3, 2008

(65) Prior Publication Data

US 2009/0063132 A1 Mar. 5, 2009

(30) Foreign Application Priority Data

Sep. 5, 2007 (JP) ................ P2007-230622

(51) Int. Cl.
*G06F 17/00* (2006.01)
(52) U.S. Cl. .......................... 704/9; 704/240
(58) Field of Classification Search ............... 704/9, 270
See application file for complete search history.

(56) References Cited

FOREIGN PATENT DOCUMENTS

| JP | 11-25092 | 1/1999 |
|---|---|---|
| JP | 2000-250937 | 9/2000 |
| JP | 2001-75973 | 3/2001 |
| JP | 2003-248676 | 9/2003 |
| JP | 2003-256449 | 9/2003 |
| JP | 2005-135113 | 5/2005 |
| JP | 2006-209173 | 8/2006 |
| JP | 2006-309751 | 11/2006 |
| JP | 2006-344102 | 12/2006 |
| JP | 2007-128401 | 5/2007 |

OTHER PUBLICATIONS

Y. Ogawa et al., "A Compound Keyword Assignment Method for Japanese Texts," Information Processing Society of Japan, vol. 93, No. 79, pp. 103-110 (1993).
"Decision of Refusal," in Japanese Patent Application No. 2007-230622, filed Sep. 5, 2007 (Drafting date: Jul. 2, 2009).
Y. Ogawa et al., "A Compound Keyword Assignment Method for Japanese Texts," Information Processing Society of Japan, pp. 103-110 (1993).
"Notification of Reasons for Refusal," in Japanese Patent Application No. 2007-230622, filed Sep. 5, 2007 (Drafting date: Apr. 8, 2009).

*Primary Examiner* — Justin Rider
(74) *Attorney, Agent, or Firm* — Finnegan, Henderson, Farabow, Garrett & Dunner, L.L.P.

(57) ABSTRACT

An information processing apparatus includes: morphological analysis means for performing morphological analysis on a text document; managing means for managing a connection pattern indicating a connection relationship of a morpheme of a predetermined part of speech; and extracting means extracting, from a string of morphemes obtained by performing morphological analysis by the morphological analysis means, a phrase including a plurality of morphemes having a same connection relationship as the connection relationship indicated by the connection pattern managed by the managing means.

8 Claims, 16 Drawing Sheets

FIG. 7

- Title: AMATEUR BASEBALL, NUMBER ONE IN JAPAN CHAMPIONSHIP GAME

- Subtitle: KAMEARI TORTOISE × TODOU RABBITS

- Summary: ~KAMEARI DOME COMMENT · IWAKI MANAMI YAMADA TARO▽ "KAME WHIRLWIND · FINAL STAGE" KAMEARI, ACHIEVE A LONG-FELT WISH TO BE NUMBER ONE IN JAPAN? FASTEST MAN DURUSHIMU VS ASIAN CANNON · DAISANGEN, FATED FIGHT! (EXTENSION UNTIL END OF GAME, SUBSEQUENT PROGRAMS MIGHT BE POSTPONED OR CHANGED)

- Detail: LIVE RELAY OF PROGRESS OF "AMATEUR BASEBALL, NUMBER ONE IN JAPAN CHAMPIONSHIP GAME KAMEARI TORTOISE × TODOU RABBITS" TO BE HELD AT KAMEARI DOME, EDO. CAN KAMEARI TORTOISE, WHO AIMS TO WIN THE CHAMPIONSHIP FOR THE FIRST TIME IN AMATEUR BASEBALL, TAKE ADVANTAGE OF HOME TOWN EDO? ON THE OTHER HAND, TODOU RABBITS, WHO HAS WON THE LEAGUE CHAMPIONSHIP THE SECOND TIME AFTER 10 YEARS, HAD AN EXTRAORDINARY PENNANT RACE WITH ANNOUNCEMENT OF RETIREMENT BY DAISANGEN IN THIS SEASON, THE SECOND YEAR AFTER RELOCATION TO ANCIENT CAPITAL. IF THE RABBITS BECOME NUMBER ONE IN JAPAN, IT WILL BE SINCE 1997, WHEN THE TEAM WAS ITS PREDECESSOR, KOSAKA FOX. THE HIGHLIGHTS ARE FULL-OF-SPIRIT PITCHING BY DARUSHIMU, WHO IS THE FASTEST MAN IN BASEBALL AND HAS ATTRACTED ATTENTION BY ANNOUNCEMENT OF ENGAGEMENT, AND A FULL SWING BY DAISANGEN, WHO HAS UPDATED THE HOME-RUN RECORD IN ASIAN AMATEUR BASEBALL. ATTENTION SHOULD ALSO BE FOCUSED ON THE COMMANDS OF MANAGERS OF BOTH TEAMS, BRINGING A CONFRONTATION OF SKILLED MANAGERS.

FIG. 8

Title
{
1: AMATEUR BASEBALL | KUSAYAKYU | NOUN-GENERAL | AMATEUR BASEBALL | *
2: NUMBER ONE IN JAPAN | NIPPONICHI | NOUN-GENERAL | NUMBER ONE IN JAPAN | *
3: CHAMPIONSHIP | KETTEI | NOUN-SAHEN CONNECTION | CHAMPIONSHIP | *
4: GAME | SEN | NOUN-SUFFIX-GENERAL | GAME | *
5: . | . | MARK-PERIOD | . | *
}

Subtitle
{
6: KAMEARI | KAMEARI | NOUN-PROPER NOUN-AREA-GENERAL | KAMEARI | *
7: TORTOISE | TOTASU | NOUN-PROPER NOUN-ORGANIZATION | TORTOISE | *
8: × | KAKERU | MARK-GENERAL | × | *
9: RABBIT | USAGI | NOUN-GENERAL | RABBIT | *
10: WAY | MICHI | NOUN-GENERAL | WAY | *
11: RABBITS | null | UNKNOWN WORD | RABBITS | null
12: . | . | MARK-PERIOD | . | *
}

Summary
{
13: ~ | null | UNKNOWN WORD | ~ | null
14: KAMEARI | KAMEARI | NOUN-PROPER NOUN-AREA-GENERAL | KAMEARI | *
15: DOME | DOMU | NOUN-GENERAL | DOME | *
16:   |   | MARK-SPACE |   | *
17: COMMENT | KASETSU | NOUN-SAHEN CONNECTION | COMMENT | *
18: · | · | MARK-GENERAL | · | *
19: IWAKI | IWAKI | NOUN-PROPER NOUN-PERSONAL NAME-LAST NAME | IWAKI | *
20: MANAMI | MANAMI | NOUN-PROPER NOUN-PERSONAL NAME-FIRST NAME | MANAMI | *
21:   |   | MARK-SPACE |   | *
22: YAMADA | YAMADA | NOUN-PROPER NOUN-PERSONAL NAME-LAST NAME | YAMADA | *
23: TARO | TARO | NOUN-PROPER NOUN-PERSONAL NAME-FIRST NAME | TARO | *
24: ∇ | ∇ | MARK-GENERAL | ∇ | *
25: " | " | MARK-QUOTATION | " | *
26: KAME | KAME | NOUN-PROPER NOUN-AREA-GENERAL | KAME | *
27: WHIRLWIND | SENPU | NOUN-GENERAL | WHIRLWIND | *
28: · | · | MARK-GENERAL | · | *
29: FINAL | SAISHU | NOUN-GENERAL | FINAL | *
30: STAGE | SUTEIJI | NOUN-GENERAL | STAGE | *
31: " | " | MARK-QUOTATION | " | *
32: KAMEARI | KAMEARI | NOUN-PROPER NOUN-PERSONAL NAME-LAST NAME | KAMEARI | *
33: , | , | MARK-COMMA | , | *
34: LONG-FELT WISH | HIGAN | NOUN-GENERAL | LONG-FELT WISH | *
35: NO | NO | VERB-ADONOMINAL | NO | *
36: NUMBER ONE IN JAPAN | NIPPONICHI | NOUN-GENERAL | NUMBER ONE IN JAPAN | *
37: NARU | NARU | VERB-INDEPENDENT | NARU | BASIC FORM
38: KA | KA | PARTICLE-SUBPARTICLE/PARALLEL PARTICLE/FINAL PARTICLE | KA | *
39: ? | ? | MARK-GENERAL | ? | *
40: FASTEST | SAISOKU | NOUN-GENERAL | FASTEST | *
41: MAN | OTOKO | NOUN-GENERAL | MAN | *
42: · | · | MARK-GENERAL | · | *
43: DARUSHIMU | null | INKNOWN WORD | DARUSHIMU | null
44: V | BUI | MARK-ALPHABET | V | *
45: S | ESU | MARK-ALPHABET | S | *
46: ASIA | ASIA | NOUN-PROPER NOUN-AREA-GENERAL | ASIA | *
47: NO | NO | PARTICLE-ADONOMINAL | NO | *
48: CANNON | TAIHO | NOUN-GENERAL | CANNON | *
}

FIG. 9

Summary:
1: · | · | MARK-GENERAL | · | *
2: DAI | DAI | CONJUNCTION-NOUN CONNECTION | DAI | *
3: SAN | SAN | NOUN-NUMBER | SAN | *
4: GEN | GEN | NOUN-SUFFIX-NUMERICAL PARTICLE | GEN | *
5: , | , | MARK-COMMA | , | *
6: FATE | SHUKUMEI | NOUN-GENERAL | FATE | *
7: NO | NO | VERB-ADONOMINAL | NO | *
8: CONFRONTATION | TAIKETSU | NOUN-SAHEN CONNECTION | CONFRONTATION | *
9: ! | ! | MARK-GENERAL | ! | *
10: . | . | MARK-PERIOD | . | *

Detail:
11: EDO | EDO | NOUN-PROPER NOUN-AREA-GENERAL | EDO | *
12: · | · | MARK-GENERAL | · | *
13: KAMEARI | KAMEARI | NOUN-PROPER NOUN-PERSONAL NAME-LAST NAME | KAMEARI | *
14: DOME | DOMU | NOUN-GENERAL | DOME | *
15: DE | DE | PARTICLE-KAKUJYOSHI-GENERAL | DE | *
16: OKONAWA | OKONAWA | VERB-INDEPENDENT | OKONAU | MIZEN FORM
17: RERU | RERU | VERB-SUFFIX | RERU | BASIC FORM
18: " | " | MARK-QUOTE | " | *
19: AMATEUR BASEBALL | KUSAYAKYU | NOUN-GENERAL | AMATEUR BASEBALL | *
20: NUMBER ONE IN JAPAN | NIPPONICHI | NOUN-GENERAL | NUMBER ONE IN JAPAN | *
21: CHAMPIONSHIP | KETTEI | NOUN-SAHEN CONNECTION | CHAMPIONSHIP | *
22: GAME | SEN | NOUN-SUFFIX-GENERAL | GAME | *
23:   |   | MARK-PHRASE MARK |   | *
24: KAMEARI | KAMEARI | NOUN-PROPER NOUN-AREA-GENERAL | KAMEARI | *
25: TORTOISE | TOTASU | NOUN-PROPER NOUN-ORGANIZATION | TORTOISE | *
26: × | KAKERU | MARK-GENERAL | × | *
27: RABBIT | USAGI | NOUN-GENERAL | RABBIT | *
28: WAY | MICHI | NOUN-GENERAL | WAY | *
29: RABBITS | null | UNKNOWN WORD | RABBITS | null
30: " | " | MARK-QUOTE | " | *
31: NO | NO | PARTICLE-ADONOMINAL | NO | *
32: PROGRESS | MOYOU | NOUN-GENERAL | PROGRESS | *
33: WO | WO | PARTICLE-KAKUJYOSHI-GENERAL | WO | *
34: LIVE | NAMA | CONJUNCTION-NOUN CONNECTION | LIVE | *
35: RELAY | CHUUKEI | NOUN-SAHEN CONNECTION | RELAY | *
36: . | . | MARK-PERIOD | . | *
37: FIRST | HATSU | NOUN-GENERAL | FIRST | *
38: NO | NO | PARTICLE-ADONOMINAL | NO | *
39: AMATEUR BASEBALL | KUSAYAKYU | NOUN-GENERAL | AMATEUR BASEBALL | *
40: KAI | KAI | NOUN-SUFFIX-GENERAL | KAI | *
41: CHAMPIONSHIP | SEIHA | NOUN-SAHEN CONNECTION | CHAMPIONSHIP | *
42: WO | WO | PARTICLE-KAKUJYOSHI-GENERAL | WO | *
43: AIM | MEZASU | VERB-INDEPENDENT | MEZASU | MIZEN FORM
44: KAMEARI | KAMEARI | NOUN-PROPER NOUN-AREA-GENERAL | KAMEARI | *
45: TORTOISE | TOTASU | NOUN-PROPER NOUN-ORGANIZATION | TORTOISE | *
46: ......

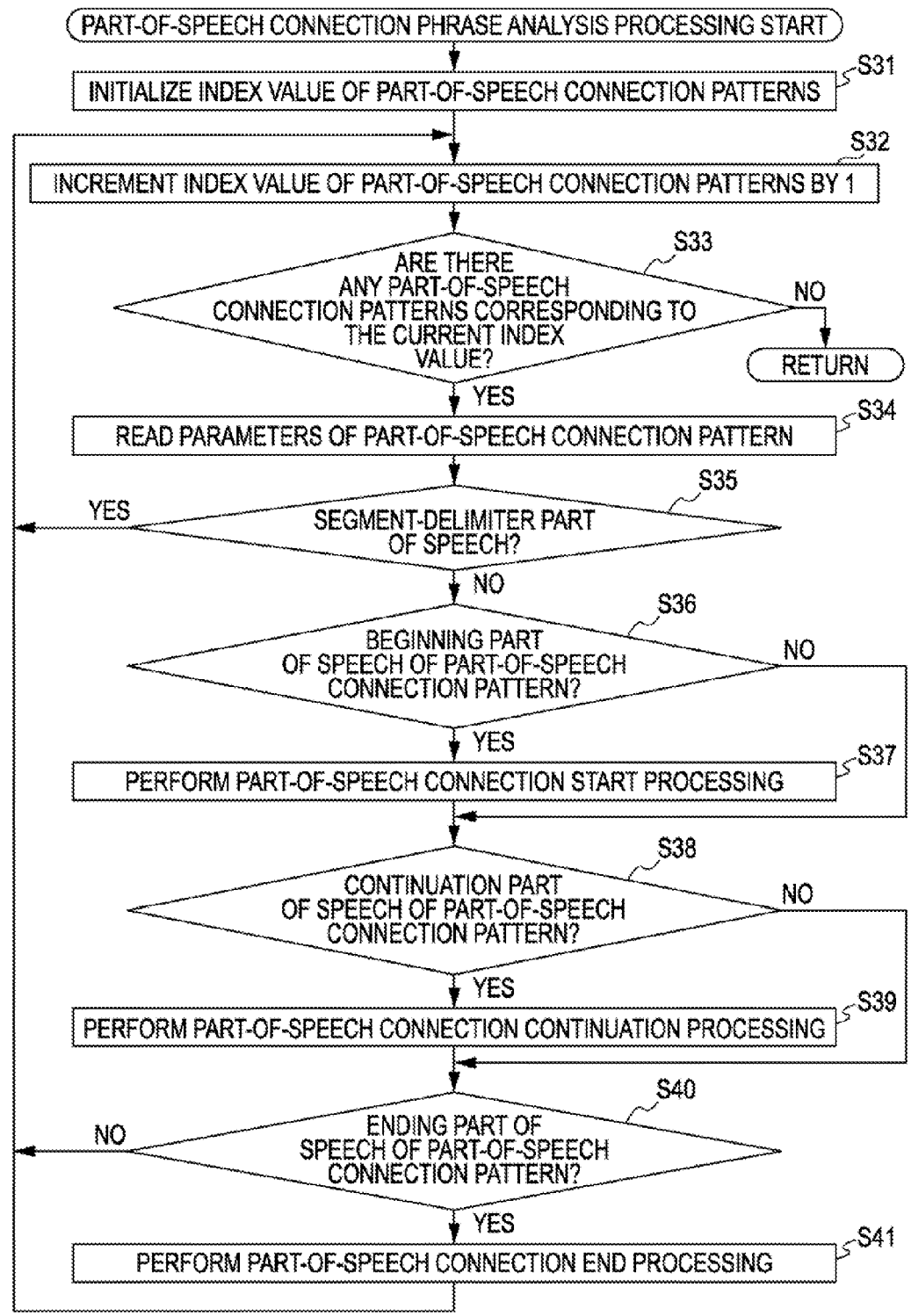

FIG. 11

|  | INDEX VALUE |
|---|---|
| PART-OF-SPEECH CONNECTION PATTERN 1 | 1 |
| PART-OF-SPEECH CONNECTION PATTERN 2 | 2 |
| PART-OF-SPEECH CONNECTION PATTERN 3 | 3 |
| PART-OF-SPEECH CONNECTION PATTERN 4 | 4 |
| PART-OF-SPEECH CONNECTION PATTERN 5 | 5 |
| ⋮ | ⋮ |

FIG. 13

HOME-RUN RECORD IN ASIAN AMATEUR BASEBALL, weight = 0.523
LEAGUE CHAMPIONSHIP, weight = 0.375
HOME-RUN RECORD IN AMATEUR BASEBALL, weight = 0.375
TEAM MANAGER, weight = 0.375
CONFRONTATION OF SKILLED MANAGERS, weight = 0.375
AMATEUR BASEBALL WORLD CHAMPIONSHIP, weight = 0.375
AMATEUR BASEBALL HOME RUN, weight = 0.332
TODOU, weight = 0.332
AMATEUR BASEBALL NUMBER ONE IN JAPAN, weight = 0.332
FASTEST MAN IN BASEBALL, weight = 0.332
FINAL STAGE, weight = 0.332
FASTEST MAN, weight = 0.332
KAMEARI TORTOISE, weight = 0.32
ANNOUNCEMENT OF ENGAGEMENT, weight = 0.319
ANNOUNCEMENT OF RETIREMENT, weight = 0.319
KOSAKA FOX PERIOD, weight = 0.312
KAMEARI DOME, weight = 0.311
KAME WHIRLWIND, weight = 0.311
"KAME WHIRLWIND · FINAL STAGE", weight = 0.289
EXTRAORDINARY PENNANT RACE, weight = 0.239
LONG-WISHED NUMBER ONE IN JAPAN, weight = 0.239
FIRST AMATEUR BASEBALL, weight = 0.239
LIVE RELAY OF PROGRESS, weight = 0.212
AMATEUR BASEBALL, NUMBER ONE IN JAPAN CHAMPIONSHIP, weight = 0.212
FULL-OF-SPIRIT PITCHING BY DARUSHIMU, WHO IS THE FASTEST MAN IN BASEBALL AND HAS ATTRACTED ATTENTION, weight = 0.212
FATED CONFRONTATION, weight = 0.212
RELOCATION TO ANCIENT CAPITAL, weight = 0.212
FOX PERIOD, weight = 0.205
SECOND YEAR SINCE RELOCATION TO ANCIENT CAPITAL, weight = 0.195
AMATEUR BASEBALL, NUMBER ONE IN JAPAN CHAMPIONSHIP GAME, weight = 0.195
HOME TOWN, EDO, weight = 0.188
SECOND YEAR SINCE RELOCATION, weight = 0.17
CHAMPIONSHIP GAME, weight = 0.173
BOTH TEAM MANAGERS, weight = 0.167
FOX PERIOD IN 1997, weight = 0.158
DAISANGEN, weight = 0.15
FIRST AMATEUR BASEBALL, weight = 0.139
IWAKI MANAMI, weight = 0.102
YAMADA TARO, weight = 0.102
FULL SWING BY DAISANGEN, weight = 0.071
LIVE RELAY, weight = 0.071
RETIREMENT OF DAISANGEN, weight = 0.071
SINCE 1997, weight = 0.049

FIG. 14

AMATEUR BASEBALL, NUMBER ONE IN JAPAN CHAMPIONSHIP GAME
KAMEARI TORTOISE × TODOU RABBITS
~KAMEARI DOME COMMENT · IWAKI MANAMI YAMADA TARO▷ "KAME WHIRLWIND · FINAL STAGE"
KAMEARI, ACHIEVE A LONG-FELT WISH TO BE NUMBER ONE IN JAPAN? FASTEST MAN DURUSHIMU VS
ASIAN CANNON · DAISANGEN, FATED FIGHT! (EXTENSION UNTIL END OF GAME, SUBSEQUENT PROGRAMS
MIGHT BE POSTPONED OR CHANGED)

● PROGRAM CONTENTS:
LIVE RELAY OF PROGRESS OF "AMATEUR BASEBALL, NUMBER ONE IN JAPAN CHAMPIONSHIP GAME
KAMEARI TORTOISE × TODOU RABBITS" CAN KAMEARI TORTOISE, WHO AIMS TO WIN
THE CHAMPIONSHIP FOR THE FIRST TIME IN AMATEUR BASEBALL, TAKE ADVANTAGE OF HOME TOWN
EDO? ON THE OTHER HAND, TODOU RABBITS, WHO HAS WON THE LEAGUE CHAMPIONSHIP THE SECOND
TIME AFTER 10 YEARS, HAD AN EXTRAORDINARY PENNANT RACE WITH ANNOUNCEMENT OF RETIREMENT
BY DAISANGEN IN THIS SEASON, THE SECOND YEAR AFTER RELOCATION TO ANCIENT CAPITAL.
IF THE RABBITS BECOME NUMBER ONE IN JAPAN, IT WILL BE SINCE 1997, WHEN THE TEAM WAS
THE PREDECESSOR, KOSAKA FOX. THE HIGHLIGHTS ARE FULL-OF-SPIRIT PITCHING BY DARUSHIMU,
WHO IS THE FASTEST MAN IN BASEBALL AND HAS ATTRACTED ATTENTION BY ANNOUNCEMENT OF
ENGAGEMENT, AND A FULL SWING BY DAISANGEN, WHO HAS UPDATED THE HOME-RUN RECORD IN
ASIAN AMATEUR BASEBALL. ATTENTION SHOULD ALSO BE FOCUSED ON THE COMMANDS OF MANAGERS
OF BOTH TEAMS, BRINGING ABOUT A CONFRONTATION OF SKILLED MANAGERS.

● RECOMMENDATION REASON:
HOME-RUN RECORD IN ASIAN AMATEUR BASEBALL       FINAL STAGE
LEAGUE CHAMPIONSHIP                              FASTEST MAN
HOME-RUN RECORD IN AMATEUR BASEBALL              KAMEARI TORTOISE
TEAM MANAGER                                     ANNOUNCEMENT OF ENGAGEMENT
CONFRONTATION OF SKILLED MANAGERS                ANNOUNCEMENT OF RETIREMENT
AMATEUR BASEBALL CHAMPIONSHIP                    KOSAKA FOX PERIOD
AMATEUR BASEBALL HOME RUN                        KAMEARI DOME
TODOU                                            KAME WHIRLWIND
AMATEUR BASEBALL NUMBER ONE IN JAPAN             "KAME WHIRLWIND · FINAL STAGE"
FASTEST MAN IN BASEBALL                          EXTRAORDINARY PENNANT RACE
                                                 LONG-WISHED NUMBER ONE IN JAPAN

FIG. 15

| FIG. 15A |
| FIG. 15B |

FIG. 15A

| | F | G | H | I |
|---|---|---|---|---|
| | EVALUATION TARGET | EVALUATION OF PHRASE GOODNESS | | |
| | | DELIMITER | RECOMMENDATION REASON | ADDITION |
| 1882 | AMATEUR BASEBALL, NUMBER ONE IN JAPAN CHAMPIONSHIP GAME | | | |
| 1883 | KAMEARI TORTOISE × TODOU RABBITS ~ KAMEARI DOME  COMMENT · IWAKI MANAMI  YAMADA TARO ▽ "KAME WHIRLWIND · FINAL STAGE" KAMEARI, ACHIEVE A LONG-FELT WISH TO BE NUMBER ONE IN JAPAN? FASTEST MAN DURUSHIMU | | | |
| 1884 | VS ASIAN CANNON · DAISANGEN, FATED FIGHT! (EXTENSION UNTIL END OF GAME, SUBSEQUENT PROGRAMS MIGHT BE POSTPONED OR CHANGED) | | | |
| 1885 | LIVE RELAY OF PROGRESS OF "AMATEUR BASEBALL, NUMBER ONE IN JAPAN CHAMPIONSHIP GAME KAMEARI TORTOISE × TODOU RABBITS" TO BE HELD AT KAMEARI DOME, EDO.  CAN KAMEARI TORTOISE, WHO AIMS TO WIN THE CHAMPIONSHIP FOR THE FIRST TIME IN AMATEUR BASEBALL TAKE ADVANTAGE OF HOME TOWN EDO?  ON THE OTHER HAND, TODOU RABBITS, WHO HAS WON THE LEAGUE CHAMPIONSHIP THE SECOND TIME AFTER 10 YEARS, HAD AN EXTRAORDINARY PENNANT RACE WITH ANNOUNCEMENT OF RETIREMENT BY DAISANGEN IN THIS SEASON, THE SECOND YEAR AFTER RELOCATION TO ANCIENT CAPITAL.  IF THE RABBITS BECOME NUMBER ONE IN JAPAN IN AMATEUR BASEBALL, IT WILL BE SINCE 1997, WHEN THE TEAM WAS ITS PREDECESSOR, KOSAKA FOX. THE HIGHLIGHTS ARE FULL-OF-SPIRIT PITCHING BY DARUSHIMU, WHO IS THE FASTEST MAN IN BASEBALL AND HAS ATTRACTED ATTENTION BY ANNOUNCEMENT OF ENGAGEMENT, AND A FULL SWING BY DAISANGEN, WHO HAS UPDATED THE RECORD OF HOME RUN IN ASIAN AMATEUR BASEBALL.  ATTENTION SHOULD ALSO BE FOCUSED ON THE COMMANDS OF MANAGERS OF BOTH TEAMS, BRINGING A CONFRONTATION OF SKILLED MANAGERS. | | | |

FROM FIG. 15A

| 1886 | "KAME WHIRLWIND · FINAL STAGE" | 1 | 1 | |
| 1887 | SINCE 1997 | 1 | | |
| 1888 | HOME-RUN RECORD IN ASIAN AMATEUR BASEBALL | 1 | 1 | |
| 1889 | FOX PERIOD | | | |
| 1890 | FOX PERIOD IN 1997 | | | |
| 1891 | LEAGUE CHAMPIONSHIP | 1 | | |
| 1892 | SECOND YEAR SINCE RELOCATION | 1 | | |
| 1893 | ANNOUNCEMENT OF RETIREMENT | 1 | 1 | |
| 1894 | IWAKI MANAMI | 1 | | |
| 1895 | KAME WIRHLWIND | 1 | 1 | |
| 1896 | KAMEARI TORTOISE | 1 | | |
| 1897 | KAMEARI DOME | 1 | | |
| 1898 | FASTEST MAN IN BASEBALL | 1 | 1 | |
| 1899 | TEAM MANAGER | | | |
| 1900 | CHAMPIONSHIP GAME | 1 | | |
| 1901 | RELOCATION TO ANCIENT CAPITAL | 1 | | |
| 1902 | SECOND YEAR SINCE RELOCATION TO ANCIENT CAPITAL | 1 | | |
| 1903 | KOSAKA FOX PERIOD | 1 | | |
| 1904 | ANNOUNCEMENT OF ENGAGEMENT | 1 | 1 | |
| 1905 | FINAL STAGE | 1 | 1 | |
| 1906 | FASTEST MAN | 1 | 1 | |
| 1907 | YAMADA TARO | 1 | | |
| 1908 | FATED CONFRONTATION | 1 | 1 | |

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-230622 filed in the Japanese Patent Office on Sep. 5, 2007, the entire contents of which are incorporated herein by reference.

BACKGROUND OF THE INVENTION

1. Field of the Invention

The present invention relates to an information processing apparatus, an information processing method, and a program. For example, the present invention relates to an information processing apparatus, an information processing method, and a program which are capable of extracting a phrase allowing to be used for a recommendation reason of a content.

2. Description of the Related Art

Related-art key-word/phrase extraction techniques are generally implemented by natural language processing (Japanese Unexamined Patent Application Publication No. 2006-209173).

The key-word/phrase extraction functions in related-art text-mining tools available on the market up to now and in Web applications have been intended for abstracting text documents and for question answering to queries (Japanese Unexamined Patent Application Publication No. 2006-344102).

In recent years, content-recommendation systems have been implemented at some Web sites, or in AV (Audio Visual) apparatuses (Japanese Unexamined Patent Application Publication No. 2006-309751). Among these systems, some apparatuses have a function of recommending a content and presenting keywords of a word level or all the sentences that are extracted from a text document including a description of information on the content.

SUMMARY OF THE INVENTION

If a key-word/phrase extraction technique is implemented by a natural language processing as disclosed in Japanese Unexamined Patent Application Publication No. 2006-209173, it is absolutely necessary to employ a syntactic analysis technique, such as extraction of segments and modifications from a text document, etc. In order to optimize a syntactic analysis algorithm, it becomes necessary to conduct learning using a large-scale corpus data. Thus, it costs high in terms of time and a total system.

The purpose of the key-word/phrase extraction function that has been disclosed in Japanese Unexamined Patent Application Publication No. 2006-344102 is different from the extraction of a characteristic phrase from a text document, in which a review or a reputation on a content is described.

It is difficult for a user to grasp a characteristic of a content at once by a function of presenting a recommendation reason using words or all the sentences as disclosed in Japanese Unexamined Patent Application Publication No. 2006-309751.

The present invention has been made in view of these circumstances, and it is desirable to make it possible to extract a phrase which can be used for a recommendation reason of a content, for example.

According to an embodiment of the present invention, there is provided an information processing apparatus including: morphological analysis means for performing morphological analysis on a text document; managing means for managing a connection pattern indicating a connection relationship of a morpheme of a predetermined part of speech; and extracting means extracting, from a string of morphemes obtained by performing morphological analysis by the morphological analysis means, a phrase including a plurality of morphemes having a same connection relationship as the connection relationship indicated by the connection pattern managed by the managing means.

In the embodiment of the present invention, the managing means may manage a weight for each of the connection patterns, and the extracting means may give a weight to the extracted phrase in accordance with the connection pattern indicating a connection relationship of a morpheme included in the phrase.

The embodiment of the present invention may further include: recommendation means for selecting a content to be recommended to a user; and display control means for displaying information of the content selected by the recommendation means to an information processing terminal used by the user. In this case, the morphological analysis means may perform morphological analysis on a text document on the content selected by the recommendation means, the extracting means may extract a phrase from morphemes obtained by performing morphological analysis on the text document on the content selected by the recommendation means by the morphological analysis means, and the display control means may further display the phrase extracted by the extracting means as a recommendation reason of the content.

In the embodiment of the present invention, the display control means may select the phrase to be displayed as a recommendation reason of the content on the basis of a weight given by the extracting means to individual phrases.

In the embodiment of the present invention, the managing means may update and manage a weight for each of the connection patterns in accordance with an evaluation by the user who has checked the phase displayed as the recommendation reason of the content by the display control means.

According to another embodiment of the present invention, there is provided a program for causing a computer to perform processing including the steps of: performing morphological analysis on a text document; managing a connection pattern indicating a connection relationship of a morpheme of a predetermined part of speech; and extracting, from a string of morphemes obtained by performing morphological analysis by the step of performing morphological analysis, a phrase including a plurality of morphemes having a same connection relationship as a connection relationship indicated by the managed connection pattern.

In an embodiment of the present invention, morphological analysis is performed on a text document, a connection pattern indicating a connection relationship of a morpheme of a predetermined part of speech is managed, and from a string of morphemes obtained by performing morphological analysis, an extraction is performed of a phrase including a plurality of morphemes and having a same connection relationship as the connection relationship indicated by the managed connection pattern.

By an embodiment of the present invention, it is possible to extract, for example, a phrase allowing to be used for a recommendation reason of a content.

BRIEF DESCRIPTION OF THE DRAWINGS

FIG. 7 is a diagram illustrating an example of a text document;

FIG. 8 is a diagram illustrating a result of morphological analysis;

FIG. 9 is a diagram, continued from FIG. 8, illustrating a result of morphological analysis;

FIG. 10 is a flowchart illustrating part-of-speech connection phrase analysis processing performed in step S15 in FIG. 6;

FIG. 11 is a diagram illustrating an example of index values of part-of-speech connection patterns;

FIG. 13 is a diagram illustrating an example of determined phases;

FIG. 14 is a diagram illustrating an example of a display of a recommendation screen; and FIG. 15 is a diagram illustrating an example of a display of an evaluation screen.

DESCRIPTION OF THE PREFERRED EMBODIMENTS

Figure 1:
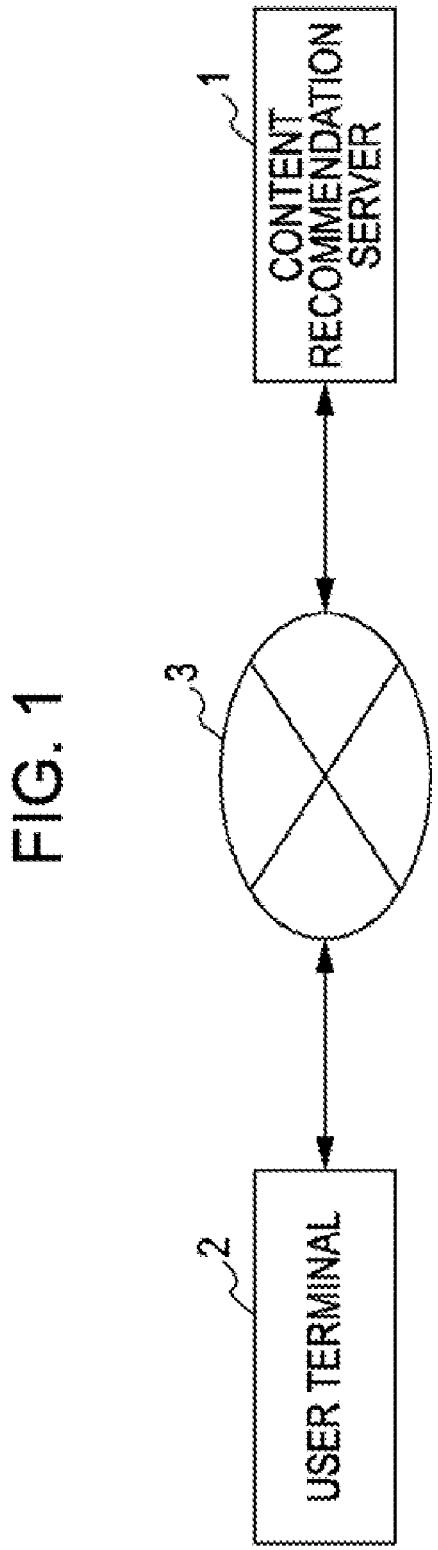
FIG. 1 is a diagram illustrating an example of a configuration of a content recommendation system according to an embodiment of the present invention.

In the following, a description will be given of an embodiment of the present invention. The relationship between the constituent features of the present invention and the embodiment described in this specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features of the present invention, the fact does not mean that the embodiment does not correspond to the constituent features of the invention. On the contrary, if an embodiment is included here as constituent features corresponding to the present invention, the fact does not mean the embodiment does not correspond to the constituent features other than that constituent feature.

According to an embodiment of the present invention, there is provided an information processing apparatus (for example, a content recommendation server 1 in FIG. 1) including: morphological analysis means (for example, a morphological analysis section 42 in FIG. 4) for performing morphological analysis on a text document; managing means (for example, a parameter management section 43 in FIG. 4) for managing a connection pattern indicating a connection relationship of a morpheme of a predetermined part of speech; and extracting means (for example, a phase extraction section 44 in FIG. 4) extracting, from a string of morphemes obtained by performing morphological analysis by the morphological analysis means, a phrase including a plurality of morphemes having a same connection relationship as the connection relationship indicated by the connection pattern managed by the managing means.

The information processing apparatus may further include: recommendation means (for example, a content recommendation section 32 in FIG. 3) for selecting a content to be recommended to a user; and display control means (for example, a display-data generation section 34 in FIG. 3) for displaying information of the content selected by the recommendation means to an information processing terminal used by the user.

According to another embodiment of the present invention, there is provided a program for causing a computer to perform processing including the steps of: performing morphological analysis on a text document; managing a connection pattern indicating a connection relationship of a morpheme of a predetermined part of speech; and extracting (for example, step S15 in FIG. 6), from a string of morphemes obtained by performing morphological analysis by the step of performing morphological analysis, a phrase including a plurality of morphemes having a same connection relationship as a connection relationship indicated by the managed connection pattern.

In the following, a description will be given of an embodiment of the present invention with reference to the drawings.

FIG. 1 is a diagram illustrating an example of a configuration of a content recommendation system according to an embodiment of the present invention.

The content recommendation system includes a content recommendation server 1 and a user terminal 2 connected to each other through the Internet 3. Although only one terminal is shown as a terminal capable of communicating with the content recommendation server 1 in FIG. 1, in reality, a plurality of terminals are connected to the Internet 3, and are capable of communicating with the content recommendation server 1.

The content recommendation server 1 manages information on a content, such as a television program, etc., selects a predetermined content from the contents whose information is managed as a recommendation content, and provides the information on the recommended content to the user terminal 2 through the Internet 3. For a recommended content, for example, a content matching a preference of the user of the user terminal 2 is selected. The contents concerning the topics which are simply attracting public attention, or the contents highly recommended by a broadcasting station may be selected.

A content recommendation screen is display onto the user terminal 2 on the basis of the information transmitted from the content recommendation server 1. On the content recommendation screen, not only the information on the recommended content, such as a title, a summary, etc., but also a recommendation reason is displayed. The recommendation reason is presented by a phrase extracted from a text document on the recommended content.

Here, a phrase is referred to a character string including a plurality of morphemes arranged in a text document. The phrase is a character string which is shorter than a sentence including a character string from a punctuation mark at a certain position to the next punctuation mark, and is longer the a word including one morpheme.

When a comparison is made between a time period for reading all the sentences and a time period for reading only phrases, it takes shorter time in the latter case. Thus, the presentation of a recommendation reason by phrases makes it possible for the user to check a recommendation reason quickly as compared with the case of presenting the recommendation reason by sentences.

Also, more persuasive expression is possible in the case of phrases than in the case of only words. Thus, it is possible for the user to check the meaning of a recommendation reason by phrases more easily than in the case of showing only words to present a recommendation reason.

A description will be given later of a series of processing of the content recommendation server 1, which presents the above-described recommendation reason to the user, with reference to the flowcharts.

Figure 2:
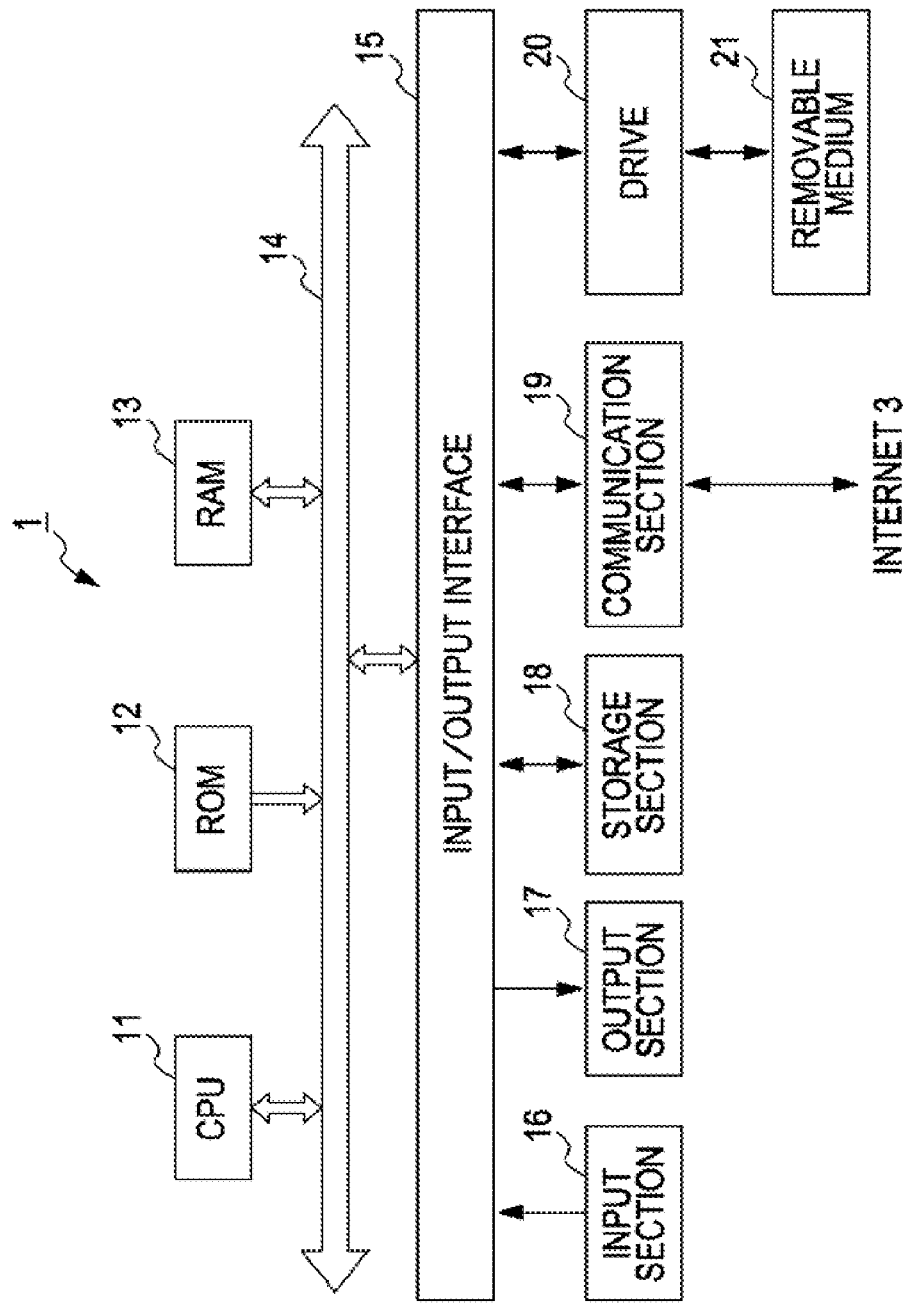
FIG. 2 is a block diagram illustrating an example of a hardware configuration of a content recommendation server.

FIG. 2 is a block diagram illustrating an example of a hardware configuration of the content recommendation server 1 in FIG. 1.

A CPU (Central Processing Unit) 11 performs various kinds of processing in accordance with the programs stored in a ROM (Read Only Memory) 12 or the programs loaded from a storage section 18 to a RAM (Ransom Access Memory) 13. Also, the RAM 13 appropriately stores necessary data for the CPU 11 executing various kinds of processing.

The CPU 11, the ROM 12, and the RAM 13 are mutually connected through a bus 14. An input/output interface 15 is also connected to the bus 14.

An input section 16 including a keyboard, a mouse, etc., an output section 17 including an LCD (Liquid Crystal Display), etc., a storage section 18 including a hard disk, etc., and a communication section 19 performing communication with the user terminal 2 through the Internet 3 are connected to the input/output interface 15.

A drive 20 is also connected to the input/output interface 15. A removable medium 21 including an optical disc, a semiconductor memory, etc., are appropriately mounted to the drive 20, and computer programs read from the removable medium 21 are installed in the storage section 18 as necessary.

Figure 3:
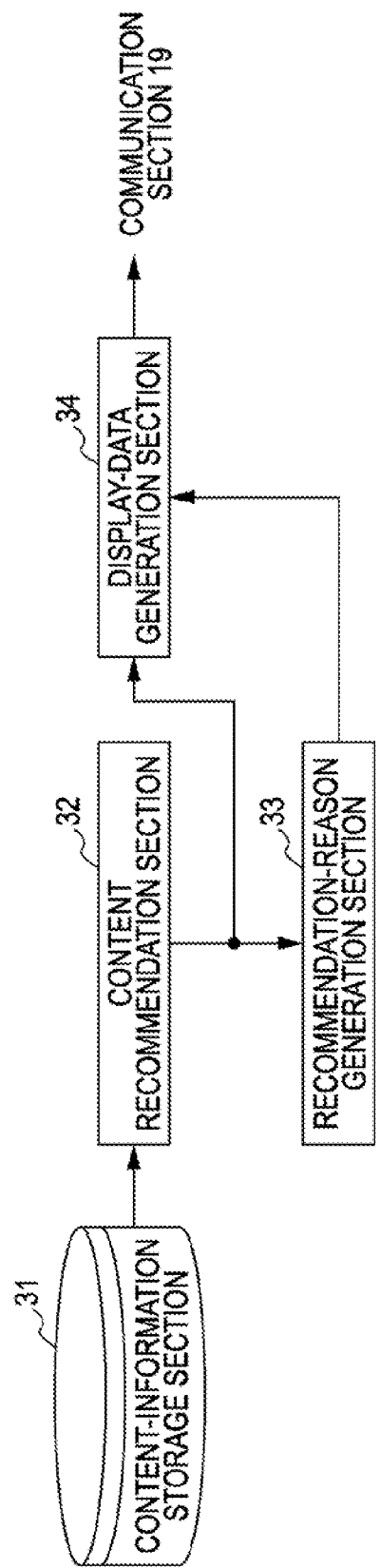
FIG. 3 is a block diagram illustrating a functional configuration of the content recommendation server.

FIG. 3 is a block diagram illustrating a functional configuration of the content recommendation server 1. At least a part of the functional block shown in FIG. 3 is achieved by executing a predetermined program by the CPU 11 in FIG. 2.

As shown in FIG. 3, in the content recommendation server 1, a content-information storage section 31, a content recommendation section 32, a recommendation-reason generation section 33, and a display-data generation section 34 are implemented.

The content-information storage section 31 stores information on a content. The information stored in the content-information storage section 31 is referenced by the content recommendation section 32 for selecting a content to be recommended.

For example, for each content broadcast by a television broadcasting or a broadcasting through the Internet 3, the title of the content, the category of the content, a summary, a broadcasting date and time, a channel number, the information showing the detail of the content are stored in the content-information storage section 31.

The content recommendation section 32 refers to the information stored in the content-information storage section 31 to select a recommended content. For example, the content recommendation section 32 obtains a user's viewing history and a recording history from the user terminal 2, and selects a recommended content on the basis of the preference of the user of the user terminal 2 so as to select a content in the same category as the category of the contents the user often views and records, and a content in which the same performer as the performers of the contents the user often views and records. For an algorithm for recommending a content, it is possible to employ the same technique as that disclosed in Japanese Unexamined Patent Application Publication No. 2005-176404.

The content recommendation section 32 outputs the information of the selected recommended content to the recommendation-reason generation section 33, and to the display-data generation section 34. For example, the content recommendation section 32 outputs information of each item of Title, Subtitle, names of performers (Summary), and Detail of the recommended content to the recommendation-reason generation section 33, and to the display-data generation section 34. The information of each of the items is the information including a character string.

The recommendation-reason generation section 33 extracts a predetermined number of phrases from a text document including a character string supplied from the content recommendation section 32, and outputs the extracted phrases to the display-data generation section 34 as a recommendation reason.

The display-data generation section 34 generates data for displaying a recommendation screen on the basis of the text document supplied from the content recommendation section 32 and a recommendation reason supplied from the recommendation-reason generation section 33. The display-data generation section 34 controls the communication section 19 to transmit the generated data to the user terminal 2 in order to display the recommendation screen to the user terminal 2. Of the information displayed on the recommendation screen, the information on the recommended content, such as a title, a summary, etc., are displayed on the basis of the text document supplied from the content recommendation section 32, and a recommended reason is displayed on the basis of the phrases supplied from the recommendation-reason generation section 33.

Figure 4:
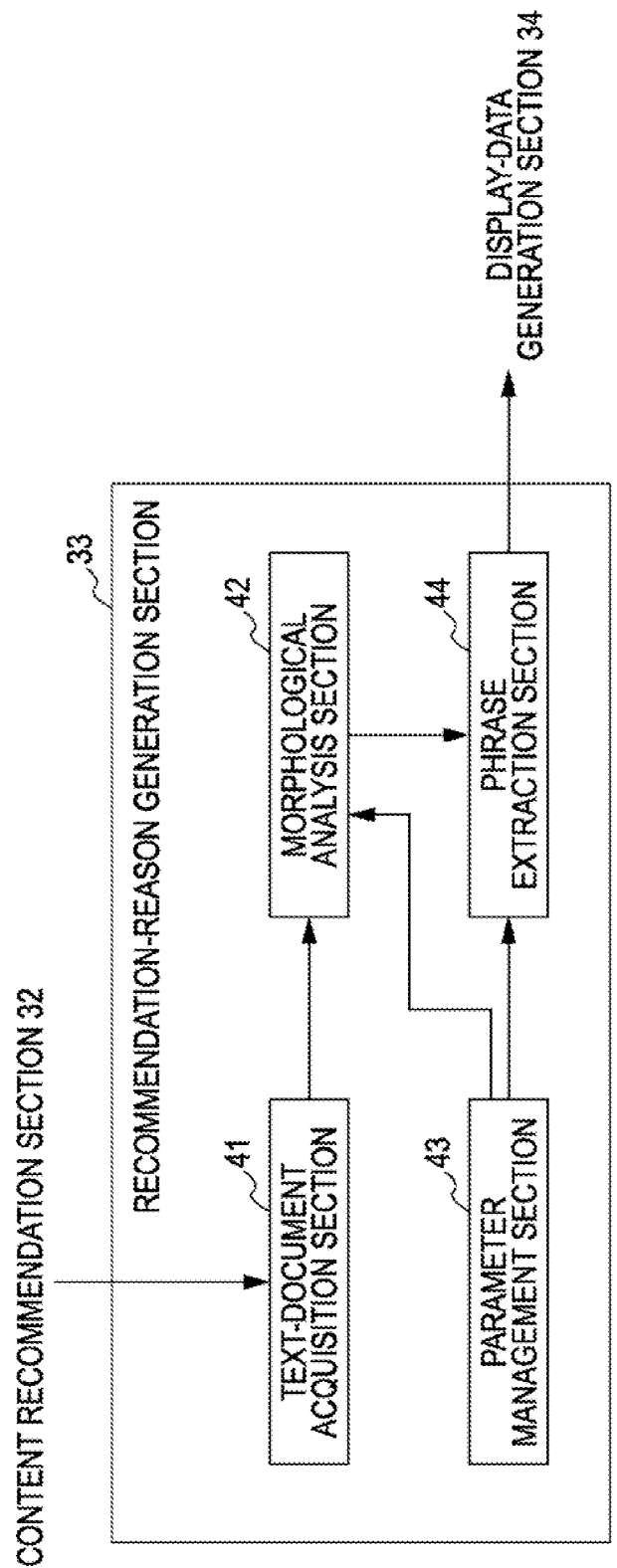
FIG. 4 is a block diagram illustrating an example of a configuration of a recommendation-reason generation section in FIG. 3.

FIG. 4 is a block diagram illustrating an example of a configuration of the recommendation-reason generation section 33.

As shown in FIG. 4, the recommendation-reason generation section 33 includes a text-document acquisition section 41, a morphological analysis section 42, a parameter management section 43, and a phrase extraction section 44.

The text-document acquisition section 41 acquires a character string of each item supplied from the content recommendation section 32, and sets the text document including the acquired character string as the document to be the target of morphological analysis.

The morphological analysis section 42 shapes the text document set by the text-document acquisition section 41 in accordance with a text-shaping rule set by the parameter management section 43, and performs morphological analysis on the text document obtained by the shaping. The morphological analysis section 42 outputs a string of morphemes obtained by performing the morphological analysis to the phrase extraction section 44. For a morphological analysis tool, for example, free software, ChaSen (http://chasen-.naist.jp/hiki/ChaSen/), which was developed by Nara Institute of Science and Technology, can be used.

The parameter management section 43 sets parameters to be used for morphological analysis performed by the morphological analysis section 42 and phrase extraction by the phrase extraction section 44. For example, the parameter management section 43 sets five parameters for a part-of-speech connection pattern (start, continuation, and end), a weight for each part-of-speech connection pattern, a segment-delimiter part of speech, a text-shaping rule, and a phrase prohibition pattern.

The part-of-speech connection pattern indicates a connection relationship of parts of speech (morphemes) constituting a phrase to be extracted.

For example, a part-of-speech connection pattern can be specified as "Start=noun-general, Connect=*, End=noun-general". This indicates that a connection of one phrase is started from a morpheme classified as "noun-general", the connection of the one phrase is continued by a morpheme of any part of speech, and the connection of the one phrase is ended by a morpheme of classified as "noun-general". Specifically, when this part-of-speech connection pattern is noticed, if a text document to be subjected to phrase extraction includes a character string " . . . in front of a global-scale of disaster . . . ", the phrase "scale of disaster" including "scale", which is classified as a "noun-general" part of speech, "of", which is classified as a "particle-adnominalization" part of speech (in the Japanese language), and "disaster", which is classified as a "noun-general" part of speech.

A plurality of part-of-speech connection patterns are set in addition to the pattern "Start=noun-general, Connect=*, End=noun-general". For example, a pattern "Start=noun-general, Connect=noun-adjective verb stem, End=noun-suffix-sahen connection", and a pattern "Start=noun-proper noun-general, Connect=particle-adnominalization-general, End=noun-sahen connection". A part-of-speech connection pattern can be specified using "and", "or", and "not" in addition to the "*". Also, it is possible to combine a plurality of part-of-speech connection patterns themselves.

A weight for each part-of-speech connection pattern is a weight to be set for each part-of-speech connection pattern. The part-of-speech connection pattern may be set to a fixed value by the content recommendation server 1, or as described below, a value set in advance may be optimized by the evaluation of the user who has checked a recommendation-reason phrase.

For a phrase including morphemes having the same connection relationship as a connection relationship indicated by a certain part-of-speech connection pattern, the same weight is given to the phrase as the weight given to that part-of-speech connection pattern. The weight of a phrase is used for the selection of the phrase to be displayed as a recommendation reason, and the determination of how to display the phrase.

A segment-delimiter part of speech is a part of speech which means the end of the connection common to all the part-of-speech connection patterns. As a segment-delimiter part of speech, in general, a period or a comma (Japanese) is set.

A text-shaping rule is a rule of morphological analysis in accordance with the purpose of morphological analysis. For the text-shaping rule, a rule of excluding, from the target of the analysis, a character string, in parentheses, included in a text document to be the target of the morphological analysis.

A phrase prohibition pattern is set in accordance with a purpose, and indicates a part-of-speech connection pattern not suitable for a phrase to be finally extracted. Among the phrases extracted as morphemes having the same connection relationship as a connection relationship indicated by the part-of-speech connection patterns, phrases including a blank character, a mark, etc., are excluded in accordance with the phrase prohibition pattern.

These parameters are managed by the parameter management section 43. Among these parameters, the text-shaping rule is set in the morphological analysis section 42, and a part-of-speech connection pattern (start, continuation, and end), a weight for each part-of-speech connection pattern, a segment-delimiter part of speech, and a phrase prohibition pattern are set in the phrase extraction section 44.

The phrase extraction section 44 extracts a phrase to be used as a recommendation reason from a string of morphemes obtained by the morphological analysis performed by the morphological analysis section 42 in accordance with the parameters set by the phrase extraction section 44, and outputs the extracted phrases to the display-data generation section 34.

Next, a description will be given of the processing of the content recommendation server 1 having the above configuration.

Figure 5:
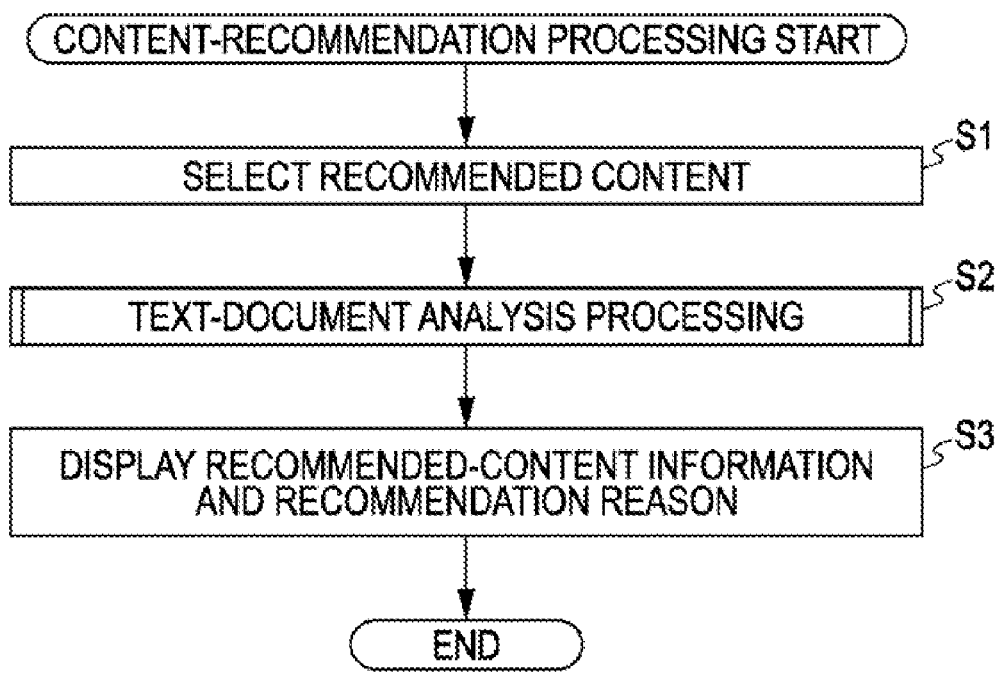
FIG. 5 is a flowchart illustrating content-recommendation processing of the content recommendation server.

First, referring to a flowchart in FIG. 5, a description will be given of the processing of the content recommendation server 1 performing recommendation of a content. The processing is started when content recommendation is requested from a user terminal 2.

In step S1, the content recommendation section 32 refers to the information stored in the content-information storage section 31 to select a recommended content. The content recommendation section 32 outputs information of each item of Title, Subtitle, Summary, and Detail of the selected recommended content to the recommendation-reason generation section 33, and to the display-data generation section 34.

In step S2, the recommendation-reason generation section 33 performs text-document analysis processing, and outputs the extracted phrases by performing the text-document analysis processing to the display-data generation section 34 as a recommendation reason. A detailed description will be given later of the text-document analysis processing with reference to the flowchart in FIG. 6.

In step S3, the display-data generation section 34 displays a recommendation screen to the user terminal 2 on the basis of the text document supplied from the content recommendation section 32 and a recommendation reason supplied from the recommendation-reason generation section 33, and then terminates the processing.

Next, referring to a flowchart in FIG. 6, a description will be given of text-document analysis processing performed in step S2 in FIG. 5.

In step S11, the text-document acquisition section 41 acquires a character string of each item supplied from the content recommendation section 32, and sets a text document including a character string of each item of the acquired Title, Subtitle, Summary, and Detail to the target document of the morphological analysis.

FIG. 7 is a diagram illustrating an example of a text document acquired by the text-document acquisition section 41.

In the example of FIG. 7, "AMATEUR BASEBALL, NUMBER ONE IN JAPAN CHAMPIONSHIP GAME" is the character string of the Title item, and "KAMEARI TORTOISE x TODOU RABBITS" is the character string of the Subtitle. That is to say, FIG. 7 shows an example of the case where the content whose title is "AMATEUR BASEBALL, NUMBER ONE IN JAPAN CHAMPIONSHIP GAME" is selected as a recommended content.

Also, in the example of FIG. 7, "~KAMEARI DOME COMMENT•IWAKI MANAMI YAMADA TAROV"KAME WHIRLWIND•FINAL STAGE"KAMEARI, ACHIEVE A LONG-FELT WISH TO BE NUMBER ONE IN JAPSN? FASTEST MAN DURUSHIMU VS ASIAN CANNON•DAISANGEN, FATED FIGHT! (EXTENSION UNTIL END OF GAME, SUBSEQUENT PROGRAMS MIGHT BE POSTPONED OR CHANGED)" is the character string of the Summary item, and "TO BE HELD AT KAMEARI DOME, EDO . . . ATTENTION SHOULD ALSO BE FOCUSED ON . . . " is the character string of the Detail item.

A phrase of the recommendation reason is extracted from such a text document. In this regard, the text document to be the target of the analysis in the recommendation-reason generation section 33 is a group of sentences including descriptions of a content, reviews, explanations, etc., comments, reviews, and reputations by general users published on the Internet, and in publications, and the descriptions thereof may be in any format.

Figure 6:
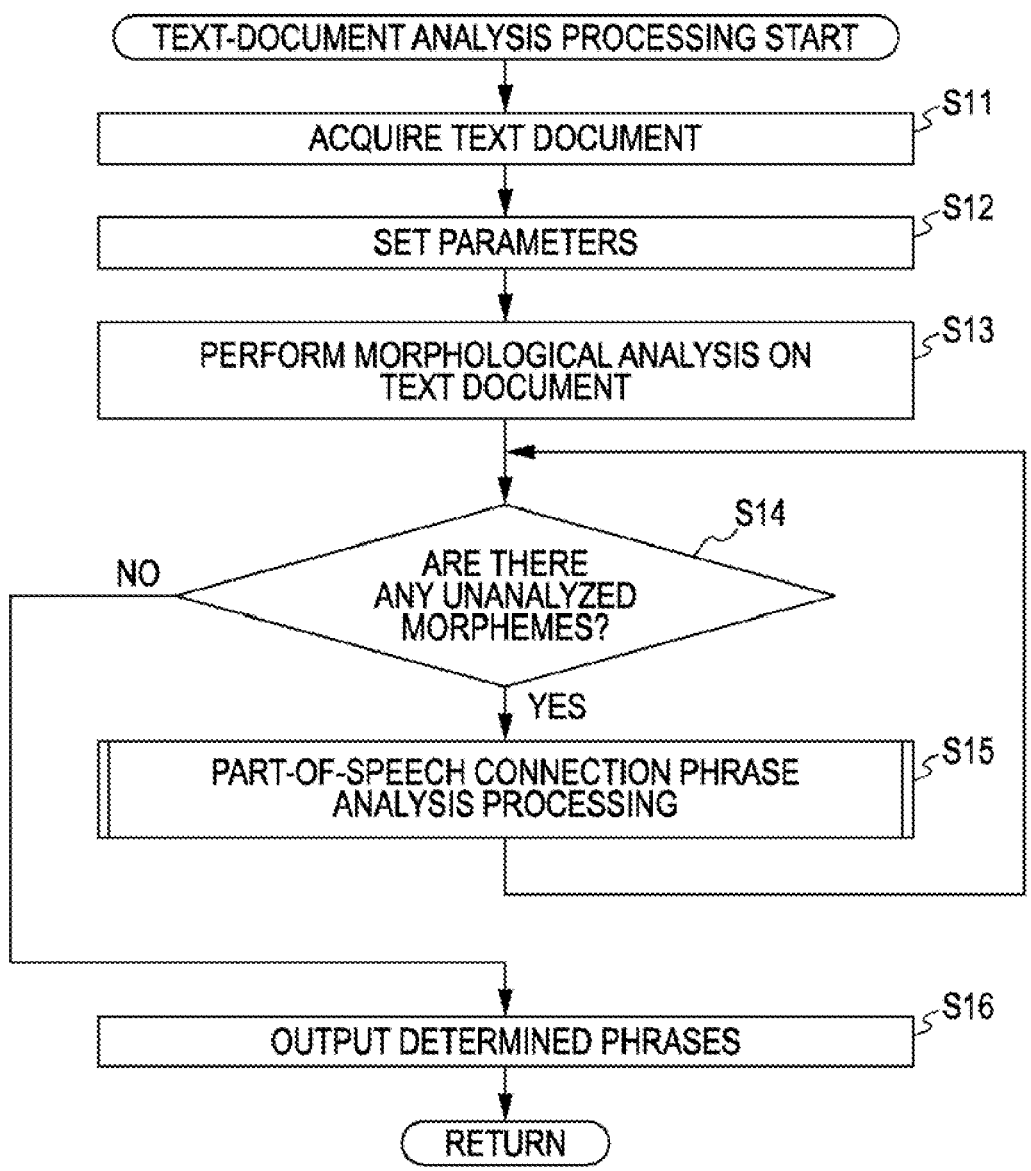
FIG. 6 is a flowchart illustrating text-document analysis processing performed in step S2 in FIG. 5.

Returning back to the description of FIG. 6, in step S12, the parameter management section 43 sets the parameter of the text-shaping rule in the morphological analysis section 42, and sets the parameters of the part-of-speech connection pattern (start, continuation, and end), the weight for each part-of-speech connection pattern, the segment-delimiter part of speech, and the phrase prohibition pattern in the phrase extraction section 44.

In step S13, the morphological analysis section 42 shapes the text document set by the text-document acquisition section 41 in accordance with the text-shaping rule set by the parameter management section 43, and performs morphological analysis on the text document obtained by shaping. The morphological analysis section 42 outputs the string of morphemes obtained by performing the morphological analysis to the phrase extraction section 44.

FIGS. 8 and 9 are diagrams illustrating a result of morphological analysis on the text document in FIG. 7.

FIGS. 8 and 9 show the results of the case where if a character string in each item of Title, Subtitle, Summary, and Detail, is not terminated by a period, a period is added, and then morphological analysis is performed. As a result of the morphological analysis, a text document is divided into morphemes, and information, such as kana (Japanese syllabic letters), a part of speech, an original form, a conjugation, etc., is added to each of the morphemes. A figure and ":" shown at the left in FIGS. 8 and 9 are added for the sake of convenience, and are not obtained as a result of morphological analysis.

The first to the fifth rows in FIG. 8 show the result of the analysis of the character string of the Title item in FIG. 7, "AMATEUR BASEBALL, NUMBER ONE IN JAPAN CHAMPIONSHIP GAME". In this example, the character string is divided into the morphemes, "AMATEUR BASEBALL", "NUMBER ONE IN JAPAN", "CHAMPIONSHIP", and "GAME". "AMATEUR BASEBALL" and "NUMBER ONE IN JAPAN" are classified as a morpheme whose part of speech is "noun-general", and "CHAMPIONSHIP" (in this case, originally, "kettei" (establish) in Japanese) is classified as a morpheme whose part of speech is "noun-sahen connection". "GAME" is classified as a morpheme whose part of speech is "noun-suffix-general".

The sixth to the twelfth rows in FIG. 8 show the result of the analysis of the character string of the Subtitle item in FIG. 7, "KAMEARI TORTOISE x TODOU RABBITS". In this example, the character string is divided into the morphemes, "KAMEARI", "TORTOISE", "x", "TO", "DOU", and "RABBITS". "KAMEARI" is classified as a morpheme whose part of speech is "noun-proper noun-area-general". "TORTOISE" is classified as a morpheme whose part of speech is "noun-proper noun-organization". Also, "x" is classified as a morpheme whose part of speech is "mark-general", "TO" is classified as a morpheme whose part of speech is "noun-general", "DOU" is classified as a morpheme whose part of speech is "noun-general", and "RABBITS" is classified as a morpheme whose part of speech is "unknown".

In the same manner, the thirteenth row in FIG. 8 to the tenth row in FIG. 9 show the result of the analysis of the character string of the Summary item in FIG. 7, "~KAMEARI DOME COMMENT•IWAKI MANAMI YAMADA TAROV"KAME WHIRLWIND•FINAL STAGE"KAMEARI, ACHIEVE A LONG-FELT WISH TO BE NUMBER ONE IN JAPSN? FASTEST MAN DURUSHIMU VS ASIAN CANNON•DAISANGEN, FATED FIGHT!" The eleventh row and after in FIG. 9 show the result of the analysis of the character string of the Detail item in FIG. 7, "TO BE HELD AT KAMEARI DOME, EDO . . . ATTENTION SHOULD ALSO BE FOCUSED ON . . . ."

Such a string of morphemes, which has been obtained by the morphological analysis, is supplied from the morphological analysis section 42 to the phrase extraction section 44 to be used for extracting a phrase.

Returning back to the description of FIG. 6, in step S14, the phrase extraction section 44 determines whether there is an unanalyzed morpheme on the determination of constituent morphemes of a phrase among the morphemes supplied from the morphological analysis section 42.

If it is determined that there is an unanalyzed morpheme in step S14, the phrase extraction section 44 notices one unanalyzed morpheme in step S15, and performs part-of-speech connection phrase analysis processing. A detailed description will be given later of the part-of-speech connection phrase analysis processing with reference to the flowchart in FIG. 10. When the part-of-speech connection phrase analysis processing has been performed on all the morphemes, a predetermined number of determined phrases to be output onto the display-data generation section 34 are stored in the buffer managed by the phrase extraction section 44.

On the other hand, if it is determined that there is no unanalyzed morphemes in step S14, the phrase extraction section 44 outputs the determined phrases stored in the buffer to the display-data generation section 34 in step S16. After that, the processing returns to step S2 in FIG. 5, and the subsequent processing is performed.

Next, a description will be given of the part-of-speech connection phrase analysis processing performed in step S15 in FIG. 6 with reference to the flowchart in FIG. 10. The processing of FIG. 10 is performed by paying notice to individual morphemes in the order of occurrence.

In step S31, the phrase extraction section 44 set the index value of the part-of-speech connection pattern to 0, for example for initialization. In the processing described below, the part-of-speech connection pattern and the weight of each part-of-speech connection pattern corresponding to the current index value is read by the phrase extraction section 44.

FIG. 11 is a diagram illustrating an example of index values of part-of-speech connection patterns.

Individual index values are set for the part-of-speech connection patterns included in the parameter set by the parameter management section 43. In the example of FIG. 11, the index value of the part-of-speech connection pattern1 is "1", and the index value of the part-of-speech connection pattern2 is "2". In the same manner, an index value is set for another part-of-speech connection pattern.

In step S32, the phrase extraction section 44 increment the index value of the part-of-speech connection pattern by one.

In step S33, the phrase extraction section 44 determines whether there is a part-of-speech connection pattern corresponding to the current index value. For example, it is assumed that there are part-of-speech connection patterns from the part-of-speech connection pattern1 in FIG. 11 to the part-of-speech connection pattern100 corresponding to an index value of 100. If the current index value is 100 or less, it is determined that there is a part-of-speech connection pattern corresponding to the current index value, whereas if the current index value is more than 100, it is determined that there is no part-of-speech connection pattern corresponding to the current index value.

In step S33, if it is determined that there is a part-of-speech connection pattern corresponding to the current index value, in step S34, the phrase extraction section 44 reads a parameter of the part-of-speech connection pattern corresponding to the current index value, that is to say, information of connection relationship of morphemes specifying a part-of-speech connection pattern and a weight for each part-of-speech connection pattern. The phrase extraction section 44 analyzes phrases by noticing each part-of-speech connection pattern in ascending order of the index value.

Figure 12:
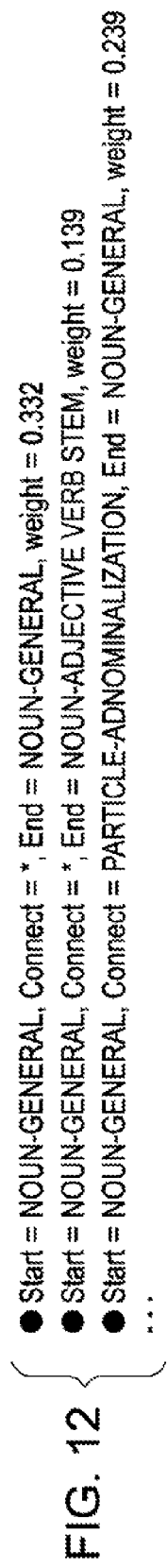
FIG. 12 is a diagram illustrating an example of weights for individual part-of-speech connection patterns.

FIG. 12 is a diagram illustrating an example of weights for individual part-of-speech connection patterns.

In the example in FIG. 12, a weight of "0.332" is given to each part-of-speech connection pattern specified by "Start=noun-general, Connect=*, End=noun-general". A weight of "0.139" is given to each part-of-speech connection pattern specified by "Start=noun-general, Connect=*, End=noun-adjective verb stem". Also, a weight of "0.239" is given to each part-of-speech connection pattern specified by "Start=noun-general, Connect=particle-adnominalization, End=noun-general".

For example, if the part-of-speech connection pattern corresponding to the current index value is the part-of-speech connection pattern shown at the top in FIG. 12, the information indicating the connection relationship of morphemes "Start=noun-general, Connect=*, End=noun-general", and a weight for each part-of-speech connection pattern of "0.332" are read.

In step S35, the phrase extraction section 44 determines whether the part-of-speech connection pattern of a noticed morpheme is a segment delimiter part-of-speech.

If the phrase extraction section 44 determines that the part-of-speech connection pattern of a noticed morpheme is a segment delimiter part-of-speech, such as a period or a comma in step S35, the phrase extraction section 44 clears the morphemes stored in the buffer until then, and the processing of the step S32 and after is repeated. That is to say, the index value is incremented by one, then a notice is paid to the part-of-speech connection pattern next to the part-of-speech connection pattern having been noticed so far, and the same analysis is repeated.

On the other hand, if the phrase extraction section 44 determines that the part-of-speech connection pattern of the noticed morpheme is not a segment delimiter part-of-speech in step S35, in step S36, the phrase extraction section 44 determines whether the part-of-speech connection pattern of the noticed morpheme is the same part of speech as that of the starting morpheme of one phrase specified by the part-of-speech connection pattern corresponding to the current index value.

For example, if the part-of-speech connection pattern corresponding to the current index value is specified by "Start=noun-general, Connect=particle-adnominalization, End=noun-general", when the noticed morpheme is a morpheme classified as "noun-general", it is determined that the part-of-speech connection pattern of the noticed morpheme is the same part of speech as that of the starting morpheme of one phrase specified by the part-of-speech connection pattern corresponding to the current index value.

In step S36, if it is determined that the part-of-speech connection pattern of the noticed morpheme is the same part of speech as that of the starting morpheme of one phrase specified by the part-of-speech connection pattern corresponding to the current index value, in step S37, the phrase extraction section 44 performs part-of-speech connection start processing. In the part-of-speech connection start processing, the noticed morpheme is stored in the buffer as the beginning morpheme constituting a new candidate phrase.

In step S36, if it is determined that the part-of-speech connection pattern of the noticed morpheme is not the same part of speech as that of the starting morpheme of one phrase specified by the part-of-speech connection pattern corresponding to the current index value, the processing in step S37 is skipped.

In step S38, the phrase extraction section 44 determines whether the part-of-speech connection pattern of the noticed morpheme is the same part of speech as that of the continuation morpheme of one phrase specified by the part-of-speech connection pattern corresponding to the current index value.

For example, if the part-of-speech connection pattern corresponding to the current index value is specified by "Start=noun-general, Connect=particle-adnominalization, End=noun-general", when the noticed morpheme is a morpheme classified as "particle-adnominalization", it is determined that the part-of-speech connection pattern of the noticed morpheme is the same part of speech as that of the continuation morpheme of one phrase specified by the part-of-speech connection pattern corresponding to the current index value.

In step S38, if it is determined that the part-of-speech connection pattern of the noticed morpheme is the same part of speech as that of the continuation morpheme of one phrase specified by the part-of-speech connection pattern corresponding to the current index value, in step S39, the phrase extraction section 44 performs part-of-speech connection continuation processing. In the part-of-speech connection continuation processing, the noticed morpheme is stored as being concatenated to the morpheme already stored in the buffer by the part-of-speech connection start processing.

In step S38, if it is determined that the part-of-speech connection pattern of the noticed morpheme is not the same part of speech as that of the continuation morpheme of one phrase specified by the part-of-speech connection pattern corresponding to the current index value, the processing in step S39 is skipped.

In step S40, the phrase extraction section 44 determines whether the part-of-speech connection pattern of the noticed morpheme is the same part of speech as that of the ending morpheme of one phrase specified by the part-of-speech connection pattern corresponding to the current index value.

For example, if the part-of-speech connection pattern corresponding to the current index value is specified by "Start=noun-general, Connect=particle-adnominalization, End=noun-general", when the noticed morpheme is a morpheme classified as "noun-general", it is determined that the part-of-speech connection pattern of the noticed morpheme is the same part of speech as that of the ending morpheme of one phrase specified by the part-of-speech connection pattern corresponding to the current index value.

In step S40, if it is determined that the part-of-speech connection pattern of the noticed morpheme is the same part of speech as that of the ending morpheme of one phrase specified by the part-of-speech connection pattern corresponding to the current index value, in step S41, the phrase extraction section 44 performs part-of-speech connection end processing. In the part-of-speech connection end processing, the noticed morpheme is stored as being concatenated to the morpheme already stored in the buffer by the part-of-speech connection continuation processing, then is temporarily extracted, and is stored in the buffer as a determined phrase only if the part-of-speech connection pattern of the extracted morpheme is not a pattern excluded as the phrase prohibition patterns.

If the part-of-speech connection end processing is performed in step S41, or if it is determined that the part-of-speech connection pattern of the noticed morpheme is not the same part of speech as that of the ending morpheme of one phrase specified by the part-of-speech connection pattern corresponding to the current index value in step S40, the processing of the step S32 and after is repeated.

When it is determined that there is no part-of-speech connection pattern corresponding to the current index value in step S33 after having analyzed all the part-of-speech connection patterns, the processing returns to step S15 in FIG. 6, and the subsequent processing is repeated. That is to say, if there is an unanalyzed morpheme, the next morpheme is noticed in the order of occurrence, and the above-described processing in FIG. 10 is performed.

When the processing in FIG. 10 has been performed by paying notice to all the morphemes, the determined phrases stored in the buffer are output from the phrase extraction section 44 to the display-data generation section 34.

FIG. 13 is a diagram illustrating an example of determined phases.

In the example in FIG. 13, the determined phrases "HOME-RUN RECORD IN ASIAN AMATEUR BASEBALL", "LEAGUE CHAMPIONSHIP", "HOME-RUN RECORD IN AMATEUR BASEBALL", "TEAM MANAGER", "CONFRONTATION OF SKILLED MANAGERS", "AMATEUR BASEBALL WORLD CHAMPIONSHIP", ..., and "SINCE 1997".

For example, "AMATEUR BASEBALL WORLD CHAMPIONSHIP" is a determined phrase including "AMATEUR BASEBALL", which is a morpheme classified as "noun-general", "WORLD", which is a morpheme classified as "noun-suffix-general", and "CHAMPIONSHIP", which is a morpheme classified as "noun-sahen connection". The weight "0.375", which is the same weight for the part-of-speech connection pattern as that set for the part-of-speech connection pattern of "Start=noun-general, Connect=noun-suffix-general, End=noun-sahen connection" is given to the phrase. In the same manner, weights are given to the other determined phrases in accordance with the connection relationship of the morphemes constituting the phrases.

In the display-data generation section 34, which has obtained these determined phrases having the weights, for example, only the determined phrases having the weights greater than a threshold value are selected as recommendation reasons, or only a predetermined number of determined phrases in descending order of the weight are selected as recommendation reasons. The selected recommendation reasons are displayed onto the recommendation screen together with the information of the recommended content.

FIG. 14 is a diagram illustrating an example of a recommendation screen to be displayed onto the user terminal 2 by the content recommendation server 1 performing the above processing.

If the user terminal 2 is an apparatus provided with a display, such as a PC (Personal Computer), a cellular phone, etc., the recommendation screen is display onto the display on the basis of the information transmitted from the content recommendation server 1. On the other hand, if the user terminal 2 is an apparatus which is to be connected to a display, such as a hard disk recorder, the recommendation screen is displayed onto the display connected to the apparatus on the basis of the information transmitted from the content recommendation server 1.

As described above, if the content whose title is "AMATEUR BASEBALL, NUMBER ONE IN JAPAN CHAMPIONSHIP GAME" is selected as a recommendation content, as shown in FIG. 14, the title of the recommendation content "AMATEUR BASEBALL, NUMBER ONE IN JAPAN CHAMPIONSHIP GAME" is display on the recommendation screen, and the subtitle "KAMEARI TORTOISE x TODOU RABBITS" is displayed below that.

Below the subtitle, the name of commentators, etc., "~KAMEARI DOME COMMENT•IWAKI MANAMI YAMADA TARO☐"KAME WHIRLWIND•FINAL STAGE"KAMEARI, ACHIEVE A LONG-FELT WISH TO BE NUMBER ONE IN JAPSN? FASTEST MAN DURUSH-IMU VS ASIAN CANNON•DAISANGEN, FATED FIGHT! (EXTENSION UNTIL END OF GAME, SUBSEQUENT PROGRAMS MIGHT BE POSTPONED OR CHANGED)" are displayed. Below that, "... TO BE HELD AT KAMEARI DOME, EDO ... ATTENTION SHOULD ALSO BE FOCUSED ON ... " is displayed as a program content.

"AMATEUR BASEBALL, NUMBER ONE IN JAPAN CHAMPIONSHIP GAME" is displayed on the basis of the character string of the Title item supplied from the content recommendation section 32 to the display-data generation section 34. "KAMEARI TORTOISE x TODOU RABBITS" is displayed on the basis of the character string of the Subtitle item supplied from the content recommendation section 32 to the display-data generation section 34.

"~KAMEARI DOME COMMENT•IWAKI MANAMI YAMADA TAROV"KAME WHIRLWIND•FINAL STAGE"KAMEARI, ACHIEVE A LONG-FELT WISH-TO BE NUMBER ONE IN JAPSN? FASTEST MAN DURUSH-IMU VS ASIAN CANNON•DAISANGEN, FATED FIGHT! (EXTENSION UNTIL END OF GAME, SUBSEQUENT PROGRAMS MIGHT BE POSTPONED OR CHANGED)" is displayed on the basis of the character string of the Summary item supplied from the content recommendation section 32 to the display-data generation section 34. "... TO BE HELD AT KAMEARI DOME, EDO ... ATTENTION SHOULD ALSO BE FOCUSED ON ... " is displayed on the basis of the character string of the Detail item supplied from the content recommendation section 32 to the display-data generation section 34.

Below the program contents, as the recommendation content of the "AMATEUR BASEBALL, NUMBER ONE IN JAPAN CHAMPIONSHIP GAME", the phrases of "HOME-RUN RECORD IN ASIAN AMATEUR BASEBALL", "LEAGUE CHAMPIONSHIP", "HOME-RUN RECORD IN AMATEUR BASEBALL", ..., and "FASTEST MAN IN BASEBALL" are displayed in the left column. In the right column, the phrases of "FINAL STAGE", "FASTEST MAN", "KAMEARI TORTOISE", ..., "LONG-WISHED NUMBER ONE IN JAPAN" are displayed.

The recommendation reason is displayed on the basis of the determined phrases supplied from the recommendation-reason generation section 33 to the display-data generation section 34.

If the recommendation content is selected in consideration of a user's preferences, the phrases of the characteristic expression and the wording that are selected. from the text document on the recommendation content can be phrases related to the user's preferences. Thus, those phrases can be used for the recommendation reasons.

In this regard, in the example in FIG. 14, among the phrases displayed as recommendation reasons, there are phrases displayed in large characters and phrases displayed in small characters. This is due to the difference in the weights of the phrases. The heavier weight a phrase has, the larger in size the phrase is displayed in order to be noticeable to the user as an important phrase.

As described above, it is possible for the content recommendation server 1 to extract phrases. Also, it is possible to recommend a content by adding the extracted phrase as a recommendation reason. Accordingly, it is possible to increase the user's acceptance of the system, and to give the user an opportunity for taking an interest in more contents.

Further, a text document is analyzed on the basis of a part-of-speech connection relationship to extract phrases. Thus, it becomes possible to reduce time cost and system cost compared with the case of extracting phrases by natural language processing. Accordingly, it is possible to implement a phrase-extraction function on a PC having a lower specification or a CE (Consumer Electronics) appliance.

Here, a description will be given of optimization of the weights in accordance with the evaluation by the user who has checked the recommendation reasons of phrases. For example, the user who has checked the recommendation reasons of phrases can evaluate appropriateness of a delimiter of morphemes, appropriateness of the recommendation reasons, etc., with respect to the individual phrases.

The evaluation by the user is reflected on a weight for a phrase, that is to say, a weight for the part-of-speech connection pattern of the phrase. A part-of-speech connection pattern of a phrase, which is positively evaluated, is set to have a greater weight for each part-of-speech connection pattern. On the contrary, a part-of-speech connection pattern of a phrase, which is negatively evaluated, is set to have a less weight for each part-of-speech connection pattern. After the reflection of the user's evaluation, a phrase of the part-of-speech connection pattern with a greater weight becomes easy to be selected as a recommendation reason, and a phrase of the part-of-speech connection pattern with a less weight becomes difficult to be selected as a recommendation reason.

FIG. 15 is a diagram illustrating an example of an evaluation screen of phrases.

When the user performs a predetermined operation in a state of the recommendation screen being displayed, the evaluation screen shown in FIG. 15 is displayed onto the user terminal 2.

In the evaluation screen in FIG. 15, each row has a number, and each column has a letter of alphabet. In each field having the F column and a row number of 1886 and more, a phrase used for a recommendation reason is displayed. At the right side of each phrase, fields are disposed for inputting evaluations of the phrase. For example, if the delimiting is appropriate, a predetermined evaluation value, such as 1 is input, and if the recommendation reason is appropriate, a predetermined evaluation value, such as 1 is input.

The user's evaluation input using the evaluation screen shown in FIG. 15 is transmitted from the user terminal 2 to the content recommendation server 1 to be used for optimization of a weight of a phrase.

It becomes possible for the content recommendation server 1 to calculate a weight of a phrase using a statistical measure by collecting and adding the evaluations by a large number of users on the phrases extracted from a large number of text documents. For example, weights are determined using a precision, a recall ratio, and an F measure used in the field of information extraction as follows.

The precision of a certain phrase (the precision of a part-of-speech connection pattern) is obtained as follows.

The precision of a certain part-of-speech connection pattern=(the number of times a phrase extracted by the part-of-speech connection pattern is evaluated as appropriate)/(the total number of phrases extracted by the part-of-speech connection pattern)

The recall ratio of a certain phrase (the recall ratio R of a part-of-speech connection pattern) is obtained as follows.

The recall ratio of a part-of-speech connection pattern=(the number of times a phrase extracted by the part-of-speech connection patter is evaluated as appropriate)/(the total number of phrases evaluated as appropriate in the overall text document)

The F measure of a certain phrase (the F measure of a part-of-speech connection pattern) is obtained as follows.

The F measure of a part-of-speech connection pattern=a harmonic mean of the precision and the recall ratio The harmonic mean is obtained by 2PB/(P+R) where the precision is P, and the recall ratio is R.

Using such a measure, it becomes possible to update a weight of a phrase dynamically. The updated weight of a phrase (weight for each part-of-speech connection pattern) is managed by the parameter management section 43.

Also, by updating the weight of a phrase using an evaluation from each user without using evaluations by a large number of users, it becomes possible to customize a part-of-speech connection pattern of a phrase which is likely to be displayed to each user.

In this regard, it is possible to refine the setting of weights of phrases in accordance with the category of a content.

Also, the evaluation by the user may not be carried out using the evaluation screen as shown in FIG. 15. The evaluation by the user may be carried out internally in accordance with the clicking on a phrase the user likes in the recommendation screen as shown in FIG. 14.

In the above, a description has been given of the case of recommending a television program. However, it is also possible to apply the above-described processing in the case of recommending another content, such as a music content, a still-image content, etc.

Also, it may be possible to recommend a completely different content related to the phrase from an extracted phrase.

In the above, the selection of a recommended content and the extraction of the phrases of the recommendation reason are performed by the content recommendation server 1. However, the selection and the extraction may be performed by a terminal used by the user, such as the user terminal 2. In this case, the extraction of the phrases to be the recommendation reason is carried out for the text document on the recommended content, which has been downloaded from a predetermined server on the Internet 3.

The above-described series of processing can be executed by hardware or can be executed by software. When the series of processing is executed by software, the programs constituting the software are built in a dedicated hardware of a computer. Alternatively, the various programs are installed, for example in a general-purpose personal computer, etc., which is capable of executing various functions from a program recording medium.

The program to be installed is recorded in a removable medium 21 shown in FIG. 2, which is an optical disc (including a CD-ROM (Compact Disc-Read Only Memory), a DVD (Digital Versatile Disc), etc.), or a semiconductor memory, etc. Alternatively, the program may be provided through wired or wireless transmission, such as a local area network, the Internet, a digital satellite broadcasting, etc. Moreover, the program may be installed in the ROM 12 or the storage section 18 in advance.

In this regard, the program executed by the computer may be the program that is processed in time series in accordance with the described sequence in this specification. Also, the programs may be the programs to be executed in parallel or at necessary timing, such as at the time of being called, or the like.

An embodiment of the present invention is not limited to the embodiment described above, and various modifications are possible without departing from the spirit and scope of the present invention.

What is claimed is:

1. An information processing apparatus comprising:
    morphological analysis means for performing morphological analysis on a text document;
    managing means for managing a connection pattern indicating a connection relationship of a morpheme of a predetermined part of speech;
    extracting means extracting, from a string of morphemes obtained by performing morphological analysis by the morphological analysis means, a phrase including a plurality of morphemes having a same connection relationship as the connection relationship indicated by the connection pattern managed by the managing means;
    wherein the information processing apparatus comprises a processor and memory.

2. The information processing apparatus according to claim 1,
    wherein the managing means manages a weight for each of the connection patterns, and
    the extracting means gives a weight to the extracted phrase in accordance with the connection pattern indicating a connection relationship of a morpheme included in the phrase.

3. The information processing apparatus according to claim 2, further comprising:
    recommendation means for selecting a content to be recommended to a user; and
    display control means for displaying information of the content selected by the recommendation means to an information processing terminal used by the user,
    wherein the morphological analysis means performs morphological analysis on a text document on the content selected by the recommendation means,
    the extracting means extracts a phrase from morphemes obtained by performing morphological analysis on the text document on the content selected by the recommendation means by the morphological analysis means, and
    the display control means further displays the phrase extracted by the extracting means as a recommendation reason of the content.

4. The information processing apparatus according to claim 3,
    wherein the display control means selects the phrase to be displayed as a recommendation reason of the content on the basis of a weight given by the extracting means to individual phrases.

5. The information processing apparatus according to claim 3,
    wherein the managing means updates and manages a weight for each of the connection patterns in accordance with an evaluation by the user who has checked the phase displayed as the recommendation reason of the content by the display control means.

6. A method of processing information, comprising the steps of:
    performing morphological analysis on a text document;
    managing a connection pattern indicating a connection relationship of a morpheme of a predetermined part of speech;
    extracting, from a string of morphemes obtained by performing morphological analysis by the step of performing morphological analysis, a phrase including a plurality of morphemes having a same connection relationship as a connection relationship indicated by the managed connection pattern;
    wherein the method of processing information is performed by an information processing apparatus comprising a processor and memory.

7. A computer-readable medium encoded with a program for causing a computer to perform processing comprising the steps of:
    performing morphological analysis on a text document;
    managing a connection pattern indicating a connection relationship of a morpheme of a predetermined part of speech; and
    extracting, from a string of morphemes obtained by performing morphological analysis by the step of performing morphological analysis, a phrase including a plurality of morphemes having a same connection relationship as a connection relationship indicated by the managed connection pattern.

8. An information processing apparatus comprising:
    a morphological analysis section for performing morphological analysis on a text document;
    a managing section for managing a connection pattern indicating a connection relationship of a morpheme of a predetermined part of speech; and
    an extracting section extracting, from a string of morphemes obtained by performing morphological analysis by the morphological analysis section, a phrase including a plurality of morphemes having a same connection relationship as a connection relationship represented by the connection pattern managed by the managing section
    wherein the information processing apparatus comprises a processor and memory.

* * * * *